United States Patent [19]
Hayashi et al.

[11] Patent Number: 4,925,436
[45] Date of Patent: May 15, 1990

[54] TENSIONER

[75] Inventors: Masaharu Hayashi, Toyota; Hisashi Kodama, Nagoya; Yoshio Okabe, Chiryu; Yukimori Kobayashi, Gamagohri; Eiji Shirai, Okazaki, all of Japan

[73] Assignee: Aisin Seiki Kabushiki Kaisha, Kariya, Japan

[21] Appl. No.: 252,046

[22] Filed: Sep. 30, 1988

[30] Foreign Application Priority Data

Sep. 30, 1987 [JP] Japan ................ 62-246692

[51] Int. Cl.⁵ ............................................. F16H 7/08
[52] U.S. Cl. ..................................... 474/101; 474/111; 474/138; 188/313
[58] Field of Search ............... 474/136, 138, 110, 111, 474/109, 115, 117, 103, 104, 135, 101; 188/315, 311, 313, 316, 297; 267/75

[56] References Cited

U.S. PATENT DOCUMENTS

| 1,539,323 | 5/1925 | Neubert et al. | 188/313 |
| 3,891,199 | 6/1975 | Willich et al. | 188/315 X |
| 4,539,001 | 9/1985 | Okabe | 474/138 |
| 4,702,726 | 10/1987 | Ojima et al. | 474/138 X |
| 4,826,470 | 5/1989 | Breon et al. | 474/110 |

Primary Examiner—Jerome W. Massie, IV
Assistant Examiner—Matthew Smith
Attorney, Agent, or Firm—Oblon, Spivak, McClelland, Maier & Neustadt

[57] ABSTRACT

For preventing very small amplitude vibrations of the rod in a tensioner during high speed movement of a belt to be tensioned by the tensioner, a tube which is connected to a plunger which moves together with the rod is overlapped with a stationary member so as to define an annular clearance therebetween in an operating chamber of the tensioner. By filling an operating fluid in the clearance, shear strain is generated upon high speed movement of the plunger, which resists movement of the plunger.

7 Claims, 4 Drawing Sheets dize
TENSIONER

BACKGROUND OF THE INVENTION

1. Field of the Invention

The present invention relates to a tensioner and in particular to a tensioner for tensioning a belt, a chain or the like.

2. Description of the Related Art

A tensioner for preventing slackening of a belt, a chain or the like has been disclosed in U.S. Pat. No. 4,539,001, for example. The conventional tensioner, as shown in FIG. 4, includes a body 51 having therein a large diameter chamber 54 and a plunger 52 which is slidably mounted in the body 51. The plunger 52 is urged continually towards the large diameter chamber 54 by a spring 57. In the plunger 52, there is formed a bore 58 in which a rod 59 is slidably fitted. Between the plunger 52 and the rod 59 is defined a small diameter chamber 61. The small diameter chamber 61 is in fluid communication with the large diameter chamber 54 through a passage 60 formed at a bottom wall of the bore 58. Operating fluid is filled in both chambers 54 and 61 and in the passage 60. The rod 59 extends from the body 51 so as to be engaged with a belt (not shown) to be tensioned. For assuring the fluid-tightness between the plunger 52 and the body 51 and the fluid-tightness between the plunger 52 and the rod 59, a seal member 53 is provided on the plunger 52 and a seal member 62 is provided on the rod 51, respectively.

With such a construction, when the tension of the belt is increased as a result of an increase in ambient temperature around the belt, the load corresponding to the increment in the belt tension is applied to the rod 59. Due to the resulting load increment, the rod 59 is moved downwardly at a distance so as to absorb the increase in the belt tension. During downward movement of the rod 59, fluid in the small diameter chamber 61 is supplied to the large diameter chamber 54 through the passage 60, thereby moving the plunger 52 in the upward direction against the load of the spring 57. On the other hand, when the tension is decreased, the rod 59 is moved upwardly due to the inflow of the fluid into the small diameter chamber 61 from the large diameter chamber 54 as a result of the expansion of the spring 57.

However, since a high pressure is generated in both chambers 61 and 51 upon downward movement of the rod 59, repeating applications of the high pressure on the seal members 53 and 62 cause damage or deformation thereof with the result that the fluid-tightness between the body 51 and the plunger 52 and the fluid-tightness between the plunger 52 and the rod 59 are not assured. In addition, due to such deformation of the seal members, air is able to invade the fluid, thereby causing erratic operation or the malfunction of the tensioner.

SUMMARY OF THE INVENTION

It is, therefore, a primary object of the present invention to provide a tensioner without the aforementioned drawbacks.

Another object of the present invention is to provide a tensioner in which a high pressure will not be generated.

Yet another object of the invention is to damp or resist vibrations of the rod which cause the repeated high pressure to be generated.

To achieve the objects and in accordance with the purposes of the present invention, a tensioner is comprised of a body having formed therein an axially extended bore having an opening and a bottom wall opposite the opening. A collar is fixedly mounted in the opening of the bore for defining an operating chamber therein, the collar having a central hole which is coaxial with the bore. A rod has one end portion which may be in operative engagement with a belt or the like to be tensioned and extends into the operating chamber after passing through the central hole in a fluid-tight manner. A plunger having axial passage means which pass therethrough is connected to the other end portion of the rod in the operating chamber. A spring urges the plunger towards the collar. Tube means are connected at one end thereof to the plunger and extend towards the bottom wall of the bore. A stationary means is positioned in the operating chamber and is overlapped with the tube means for defining annular clearance means therebetween, and an amount of fluid is filled in the annular clearance means for generating shearing force therebetween upon movement of the tube means relative to the bottom wall of the bore, thereby damping or resisting vibrations of the rod which could cause high pressure in the operating chamber.

BRIEF DESCRIPTION OF THE DRAWINGS

The above and other objects, features and advantages of the present invention will become more apparent and more readily appreciated from the following detailed description of preferred exemplary embodiments of the present invention, taken in connection with the accompanying drawings, in which.

DETAILED DESCRIPTION OF THE PREFERRED EMBODIMENTS

Figure 1:
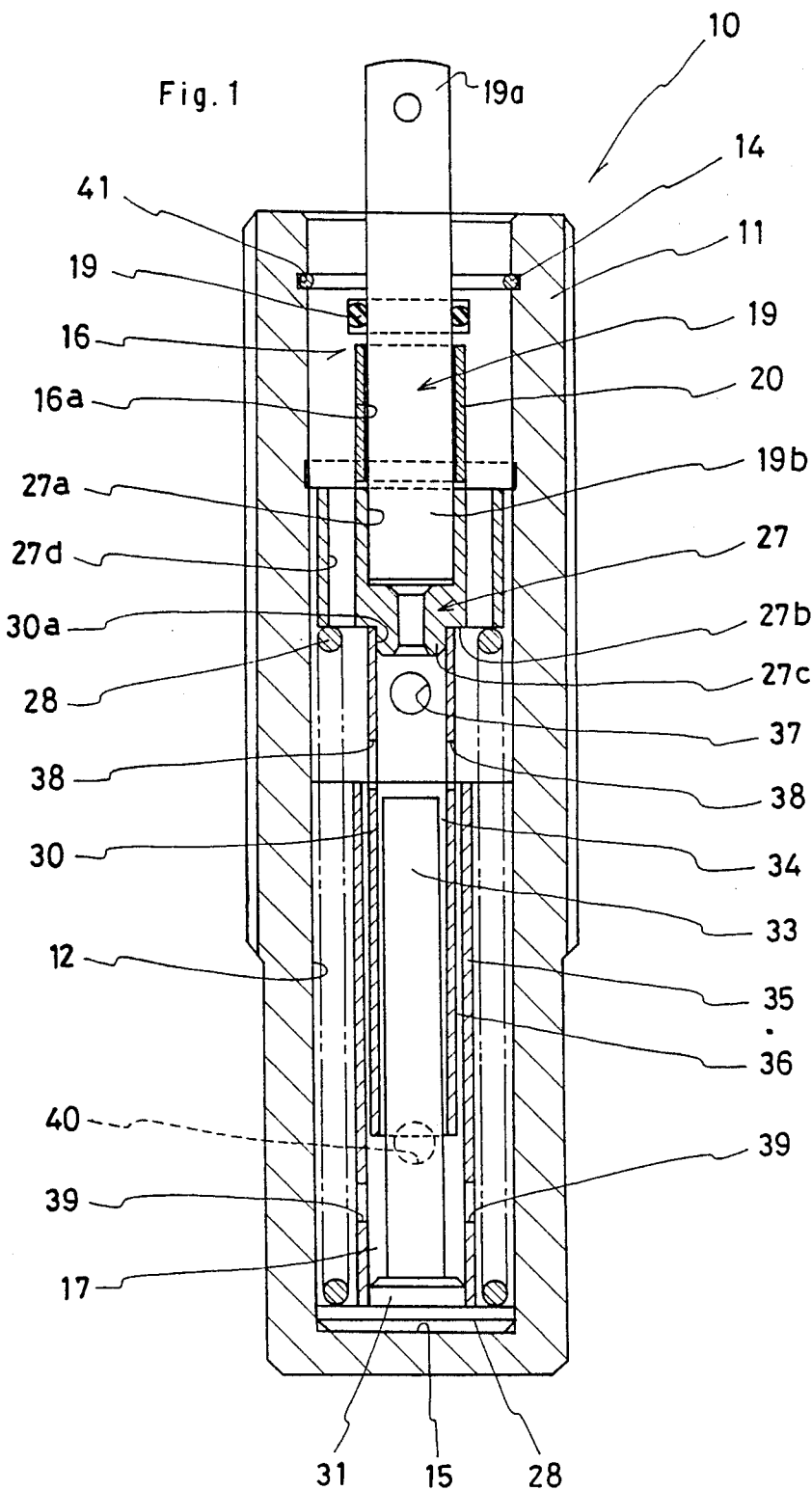
FIG. 1 is a vertical sectional view of a tensioner according to a first embodiment of the present invention.
Figure 2:
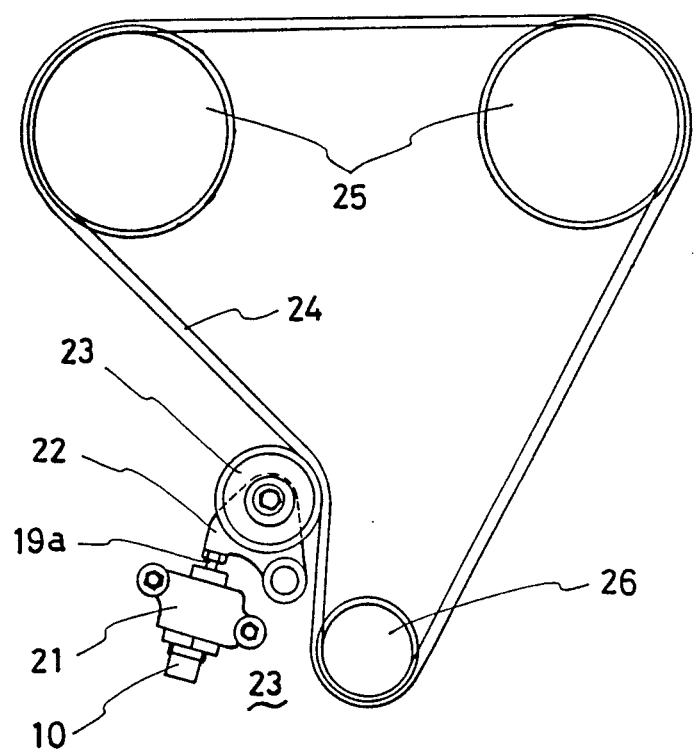
FIG. 2 is a view which shows the relationship between the tensioner shown in FIG. 1 and a belt.

Referring now to FIGS. 1 and 2, there is illustrated a tensioner 10 which includes a body 11 in which an axially extending bore 12 is formed. At an upper end and a lower end of the bore 12, there are formed an opening 13 and a bottom wall 15, respectively. In the opening 13 of the bore 12, there is fitted snugly a stationary collar 16 so that an operating chamber 17 is defined between the collar 16 and the bottom wall 15 in the bore 12. The collar 6 has formed therein an axially oriented central hole 18 which is coaxial with the bore 12. A rod 19 extends movably through the hole 18 in the collar 16. Between the collar 16 and the rod 19, a seal ring 19d and a bushing 20 are provided for assuring fluid-tightness and smooth relative movement therebetween, respectively. An upper end portion 19a of the rod 19 is connected to a bracket 22 which is pivoted to an engine 23A. The tensioner 10 is itself also fixedly mounted on the engine via a bracket 21. On the bracket 22, there is rotatably mounted a roller 23 which is in engagement with a belt 24 which is mounted on a pair of cam shafts 25 and 25 and a crank shaft 26 of the engine. A lower end portion 19b of the rod 19 is extended through the collar 16 into the operating chamber 17 and is fixed in a central hole 27a of a plunger 27. A plurality of equally circumferentially pitched axial passages 27d are formed in the plunger 27 so as to surround the central hole 27a. A spring 28 is disposed between a lower end 27b of the plunger 27 and a spacer 29 on the bottom wall 15 so as to urge the plunger 27 in the upward direction. For preventing such upward movement of the collar 16 due to the urging force thereon, a snap ring 40 which is fitted in an annular groove 41 in the bore 12 is employed to fix the position of the collar.

On the lower end 27b of the plunger 27, there is provided a downward projection 27c on which is fixed an upper end of a first tube 30 which is extended towards the bottom wall 15. From a base member 31 formed integrally with the spacer 29, a bar or stationary member 33 is extended into an interior of the first tube 30, thereby defining a first annular clearance 34 therebetween. A second tube 35, having a lower end fixed to the base member 31, extends upwardly and encloses the first tube 30. Between the first tube 30 and the second tube 35, there is defined a second annular clearance 36. On a portion near the upper opening 30a of the first tube 30, there are formed pair of radially opposite holes 37 (only one is shown). Further, on a portion of the first tube 30 near the upper opening 30a, there are formed a pair of radially opposite holes 38 which are similar to holes 37. On the second tube 35, there are formed a pair of radially opposite holes 39 near a lower end opening 30b of the first tube 30 and a pair of radially opposite holes 40 (only one is shown) near the base member 31. An amount of operating fluid is contained in the operating chamber 17 which is sufficient to fill both of the annular clearances 34 and 36. Due to existence of the fluid in clearances 34 and 36, shear strain or shearing force is generated upon movement of the first tube 30. For filling the fluid in clearances 34 and 36 at all times, a surface 150 of the fluid is set at a height above upper ends of the stationary member 33 and the second tube 35.

In operation, when the temperature of the engine rises from a normal temperature to a high temperature, a thermal expansion thereof increases the distance between the cam shafts 25 and the crank shaft 26 with the result that a tension of the belt 24 is increased. Then, the load on the plunger 27 via the rod 19 is increased, thereby moving the plunger 27 in the downward direction against the load of the spring 28 to absorb the increase in the belt tension. This continues until an equilibrium condition is achieved.

On the other hand, when the temperature of the engine falls or drops from the high temperature to a normal temperature, the tension of the belt 24 is decreased. Then, the plunger 27 is moved in the upward direction by the expansion of the spring 28, thereby minimizing the decreased belt tension.

During continual movement of the belt 24 around the cam shafts 25 and 25 and the crank shaft 26, the rod 19 is subject to very small amplitude vibrations or reciprocal vertical movements whose frequency is in proportion to the speed of the moving belt 24. Due to the resulting high speed movement of the first tube 30 relative to the stationary member 33 and the second tube 35, high shear strain or shearing force is generated in the clearances 34 and 36. This shear strain or shearing force then acts as a high resistance for damping or preventing such movement of the first tube 30, thereby minimizing the very small amplitude vibration of the rod 19. Also, fluid is supplied into each clearance 34 and 36 through the holes 37, 38, 39 and 40 for preventing any temporary lack of fluid in the clearances 34 and 36.

Figure 3:
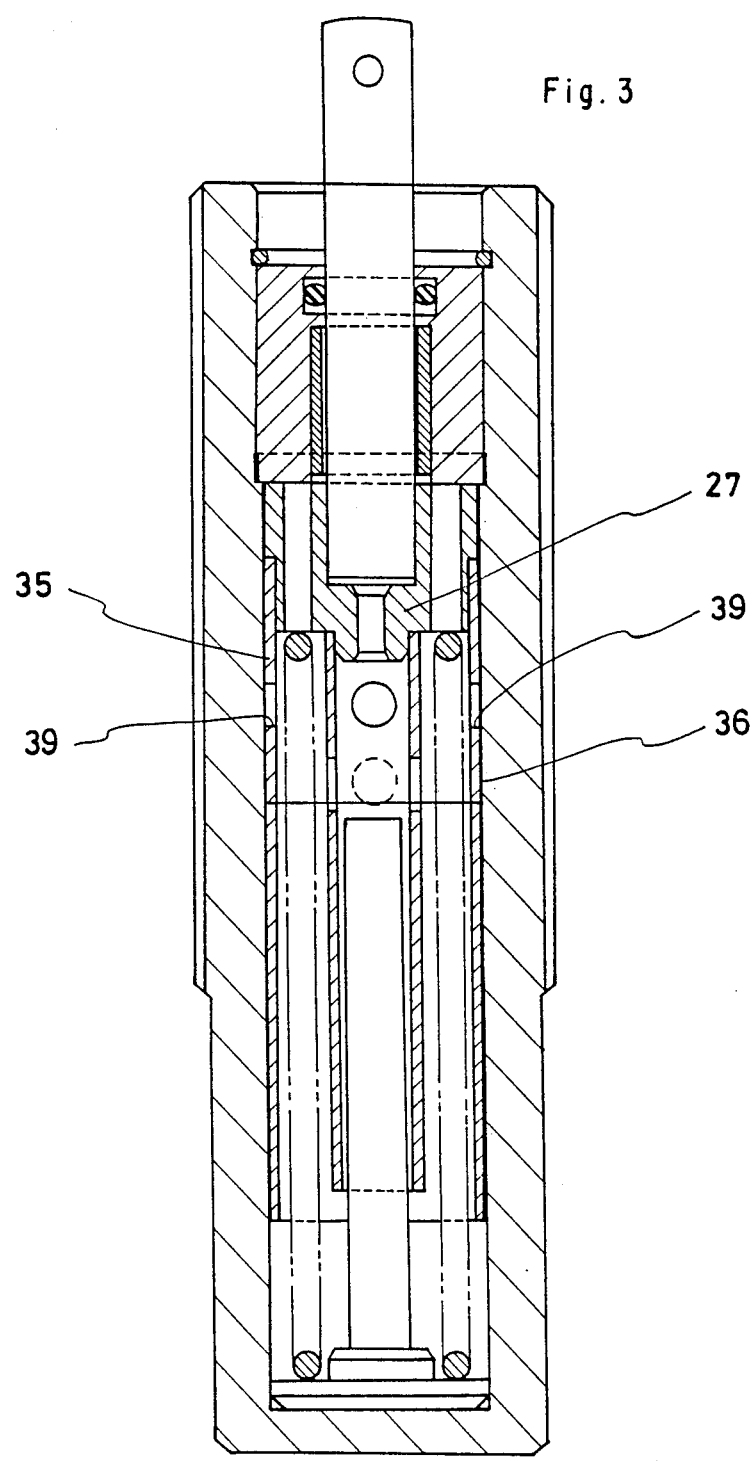
FIG. 3 is a vertical sectional view of a tensioner according to a second embodiment of the present invention.
Figure 4:
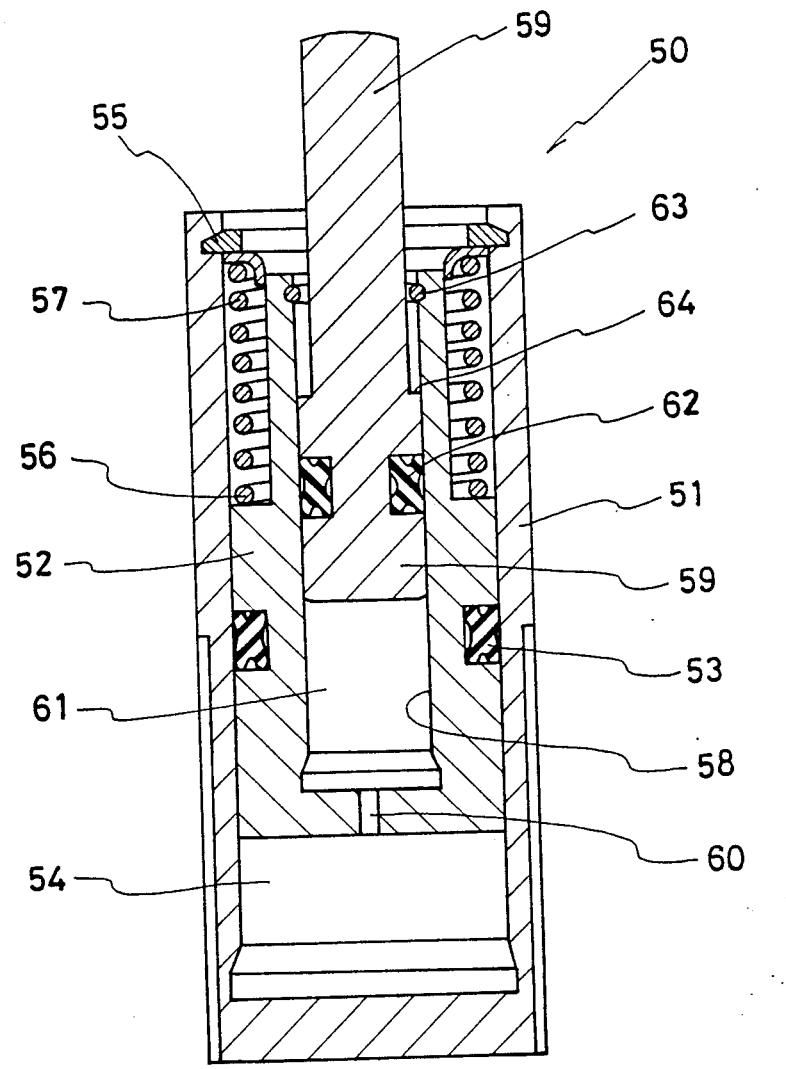
FIG. 4 is a vertical cross sectional view of a conventional tensioner.

It should be noted that either the stationary member 33 or the second tube 35 may be omitted. Further, as shown in FIG. 3, the second annular clearance 36 may be defined between an inner surface of the chamber 17 and the second tube 35 connected to the plunger 27. In this embodiment, the first tube 30 and the stationary member 33 are omitted.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A tensioner comprising:
   a body having formed therein an axially extended bore having an opening and a bottom end opposite the opening;
   a collar fixed in said opening to define an operating chamber in said bore, said collar having a central hole which is coaxial with said bore;
   a rod having one end portion which may be placed in operative engagement with an element to be tensioned, said rod passing through said hole in a fluid-tight manner and extending to said operating chamber;
   a plunger connected to an other end portion of said rod in said operating chamber;
   a spring comprising means for urging said plunger towards said collar;
   tube means connected at one end thereof to said plunger and extended towards said bottom end of said bore;
   stationary means positioned in said body and overlapping with said tube means for defining annular clearance means therebetween; and
   an amount of fluid filled in said annular clearance means, wherein said annular clearance means is sufficiently small for generating a shearing force between said tube means and said stationary means upon movement of said tube means relative to said bottom sufficient for substantially damping movement of said rod.

2. A tensioner according to claim 1, wherein said tube means is in the form of a single tube.

3. A tensioner according to claim 1, wherein said stationary means is in the form of a bar fittable in said tube means.

4. A tensioner according to claim 1, wherein said tube means includes a first tube, and said stationary means includes a bar and a second tube arranged coaxially thereto, wherein said first tube is interposed between said bar and said second tube so as to define said annular clearance means as a coaxial pair of annular clearances.

5. A tensioner according to claim 1, wherein said tube means includes a first tube and a second tube arranged coaxially thereto, and said stationary means includes a bar fitted in said first tube and an inner surface of said operating chamber overlapped with said second tube.

6. A tensioner according to claim 1 wherein said plunger has axial passage means extending therethrough.

7. A tensioner according to claim 1 including holes formed in said tube means.

* * * * *